United States Patent [19]
Broderick et al.

[11] Patent Number: 6,124,568
[45] Date of Patent: Sep. 26, 2000

[54] HEATING APPARATUS FOR A WELDING OPERATION AND METHOD THEREFOR

[75] Inventors: Thomas F. Broderick, Springboro; Richard R. Worthing, Jr., Cincinnati; Lawrence J. Roedl, West Chester, all of Ohio; John M. Powers, Independence, Ky.; Warren D. Grossklaus, Jr., West Chester, Ohio

[73] Assignee: General Electric Company, Cincinnati, Ohio

[21] Appl. No.: 09/223,793

[22] Filed: Dec. 31, 1998

[51] Int. Cl.$^7$ .................................................. B23K 9/23

[52] U.S. Cl. ............................... 219/137 WM; 219/72; 228/232

[58] Field of Search ...................... 219/137 R, 137 WM, 219/72; 228/232

[56] References Cited

U.S. PATENT DOCUMENTS

| | | | |
|---|---|---|---|
| 5,106,010 | 4/1992 | Stueber et al. | 228/232 |
| 5,319,179 | 6/1994 | Joecks et al. | 219/137 R |
| 5,897,801 | 4/1999 | Smashey et al. | 219/137 WM |

*Primary Examiner*—Clifford C. Shaw
*Attorney, Agent, or Firm*—Andrew C. Hess; Gerry S. Gressel

[57] ABSTRACT

A heating apparatus and method for welding a superalloy article. The apparatus and method of this invention provide for pre-weld and post-weld heat treatments to be performed on an article within the same enclosure in which the welding operation is performed. The apparatus accurately controls the temperature of the component to be welded throughout the temperature treatment profiles with the use of means for welding the article, means for heating the article, and means for sensing the article temperature. The apparatus also works in conjunction with a memory storage device that stores appropriate pre-weld and post-weld heat treatment temperature profiles and a welding temperature profile for the article.

5 Claims, 2 Drawing Sheets

HEATING APPARATUS FOR A WELDING OPERATION AND METHOD THEREFOR

FIELD OF THE INVENTION

This invention relates to welding apparatuses and methods. More particularly, this invention is directed to an apparatus configured to perform both a welding operation and pre-weld and post-weld heat treatments on a superalloy component.

BACKGROUND OF THE INVENTION

High temperature cobalt and nickel-based superalloys are widely used to form certain components of gas turbine engines, including combustors and turbine vanes and blades. While high-temperature superalloy components are often formed by casting, circumstances exist where superalloy components are preferably or are required to be fabricated by welding. For example, components having complex configurations, such as turbine midframes and shroud support rings, can be more readily fabricated by welding separate castings together. Welding is also widely used as a method for restoring blade tips, and for repairing cracks and other surface discontinuities in superalloy components caused by thermal cycling or foreign object impact. Because the cost of components formed from high-temperature cobalt and nickel-based superalloys is relatively high, restoring/repairing these components is typically more desirable than replacing them when they become worn or damaged.

Superalloy components of gas turbine engines must generally be thermally stress-relieved before welding to relax residual stresses present from engine service, and then stress-relieved after welding to relax residual stresses induced during cool down from the welding operation. Heat treatment also provides stress relief by dissolution of a portion of hardening gamma prime ($\gamma'$) in $\gamma'$-strengthened nickel-base superalloys. Generally, the heat treatment parameters will vary depending on the alloy of interest, the amount of residual stress relief and dissolution required, furnace design, component geometry and many other factors. The ramping rates, soak temperatures, hold times and cooling rates for stress relief and dissolution heat treatments are critical in order to obtain the desired stress relief without adversely affecting the superalloy and its properties.

In the past, pre-weld and post-weld heat treatments have been performed in large batch heat treatment furnaces to ramp and hold a group of components at a suitable heat treatment temperature. Following batch heat treatment, individual components are welded while being maintained at an elevated temperature (e.g., in excess of about 1500° F. (about 815° C.)) to improve welding yields. Welding is often performed in an enclosure containing a controlled atmosphere (e.g., an inert gas) using such welding techniques as tungsten inert gas (TIG) and laser welding processes. Heating is typically performed by induction or with the use of lamps, such as quartz halogen lamps.

While having certain benefits, drawbacks to the use of batch heat treatment processes include long heat treatment times due in part to the mass of the large batch furnace and the mass of the typically large number of components being heat treated. Additionally, long queuing times occur while batches are assembled as individual components are repaired. Therefore, use of batch furnace pre-weld and post-weld stress relief heat treatments represent a time delay to the flow of components through a welding line, and is an inefficient method to metallurgically condition components for welding.

In view of the above, it would be desirable if improved processing efficiency could be achieved for superalloy articles manufactured, restored or repaired by welding.

BRIEF SUMMARY OF THE INVENTION

The present invention generally provides a heating apparatus and method for welding a superalloy article. More particularly, the apparatus and method of this invention provide for pre-weld and post-weld heat treatments to be performed on an article within the same apparatus in which the welding operation is performed.

In view of the criticality of pre-weld and post-weld heat treatments, the invention requires that the welding apparatus be suitably configured to accurately control the temperature of the component being welded. For this reason, the apparatus of this invention generally entails an enclosure adapted for containing a superalloy article, means for welding the article, means for heating the article within the enclosure, and means for sensing the article temperature within the enclosure. The apparatus also works in conjunction with a memory storage device that stores appropriate pre-weld and post-weld heat treatment temperature profiles and a welding temperature profile for the article. Finally, the apparatus includes a control by which the output of the heating means is adjusted based on the article temperature and according to the preestablished pre-weld and post-weld heat treatment temperature and the welding temperature profile.

The method enabled by the apparatus described above generally entails preestablishing the desired pre-weld and post-weld heat treatment temperature profiles and the welding temperature profile for the superalloy article in question, placing the article in the enclosure, and then operating the heating, sensing and controlling means to accurately heat the superalloy article according to the pre-weld heat treatment temperature profile. Once properly heat treated to relieve residual stresses, and without removing the article from the enclosure, the heating, sensing and controlling means are operated to heat the article directly from the pre-weld heat treatment temperature profile to the welding temperature profile, during which the article is welded. Afterwards, and again without removing the article from the enclosure, the heating, sensing and controlling means are operated to heat the article directly from the welding temperature profile to the post-weld heat treatment temperature profile.

In view of the above, it can be appreciated that the present invention eliminates the processing drawbacks known for batch-type pre-weld and post-weld heat treatments of superalloy articles fabricated, restored or repaired by welding. Instead of accumulating a number of articles to simultaneously undergo a single heat treatment, the present invention allows a more streamlined throughput of components by combining the required heat treatments with the welding operation within a single apparatus. The invention also reduces the heat treatment durations required by reducing the thermal mass being heated and cooled during each heat treatment cycle.

Other objects and advantages of this invention will be better appreciated from the following detailed description.

DETAILED DESCRIPTION OF THE INVENTION

The present invention is generally directed to superalloy articles that undergo a welding operation during their fabrication, restoration or repair. While the advantages of this invention will be described with reference to components of gas turbine engines, the invention is also applicable to a variety of applications in which an article is to be heat treated before and after welding in a manner that will not degrade the properties of the article.

Figure 1:
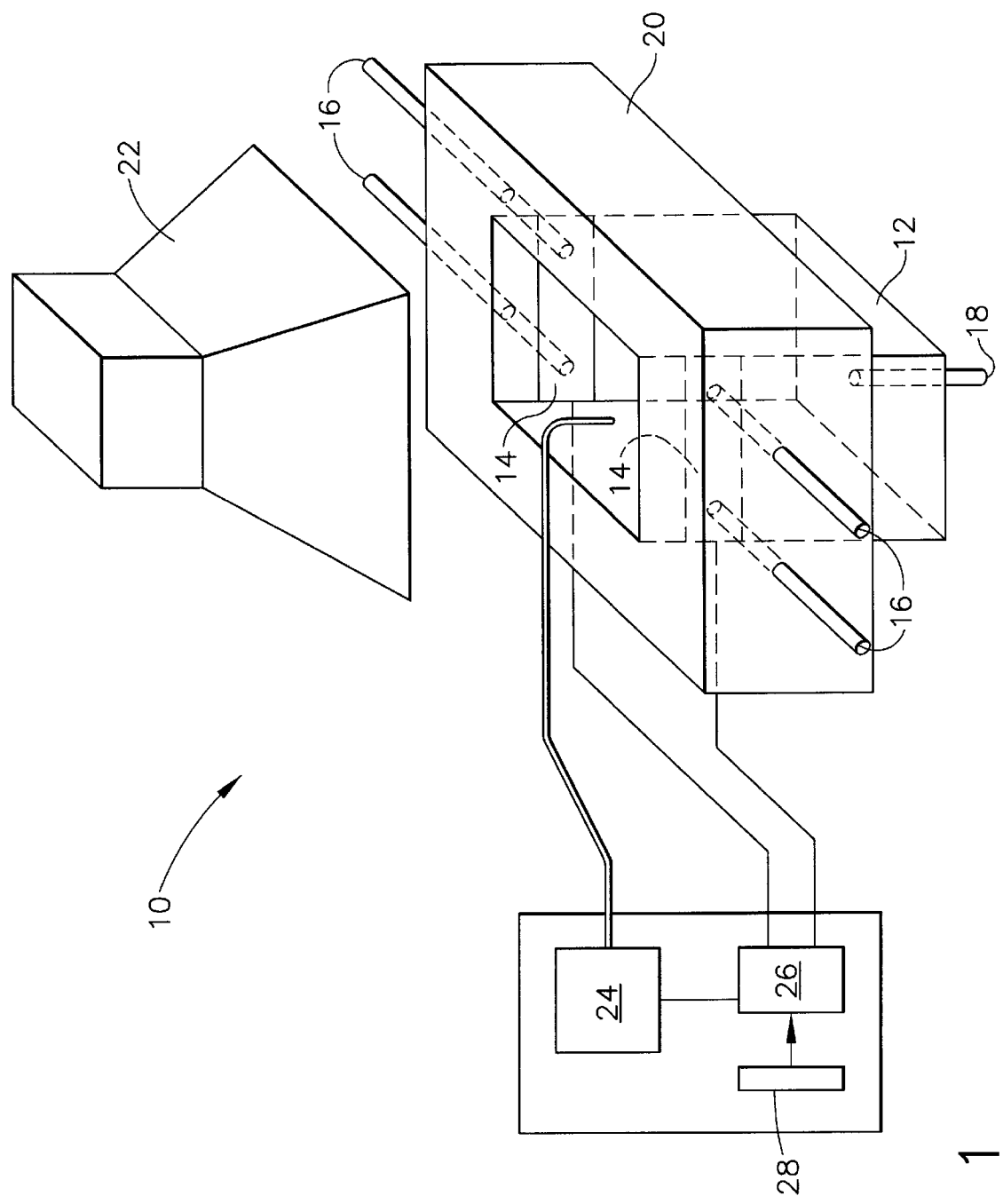
FIG. 1 is a schematic representation of a combination heat treatment and welding apparatus in accordance with this invention.

An apparatus 10 for performing the heat treatments and welding operation of this invention is schematically depicted in FIG. 1. The apparatus 10 includes an enclosure 12 generally of a type known for performing a welding operation such as TIG or laser welding in a controlled atmosphere. The apparatus 10 also includes a heating device 14 of a type known for heating the interior of the enclosure 12 during welding. Suitable devices include induction coils, quartz halogen lamps and silicon carbide elements, and may be equipped with cooling elements 16 as shown. The enclosure 12 also includes an inlet 18 through which an inert gas such as argon is fed to the interior of the enclosure 12 to prevent oxidation of the superalloy article while at the elevated processing temperatures of this invention. Also preferably included is an externally-cooled heat shield 20 surrounding the enclosure 12, and an exhaust hood 22 for removing fumes generated during the welding operation.

Figure 2:
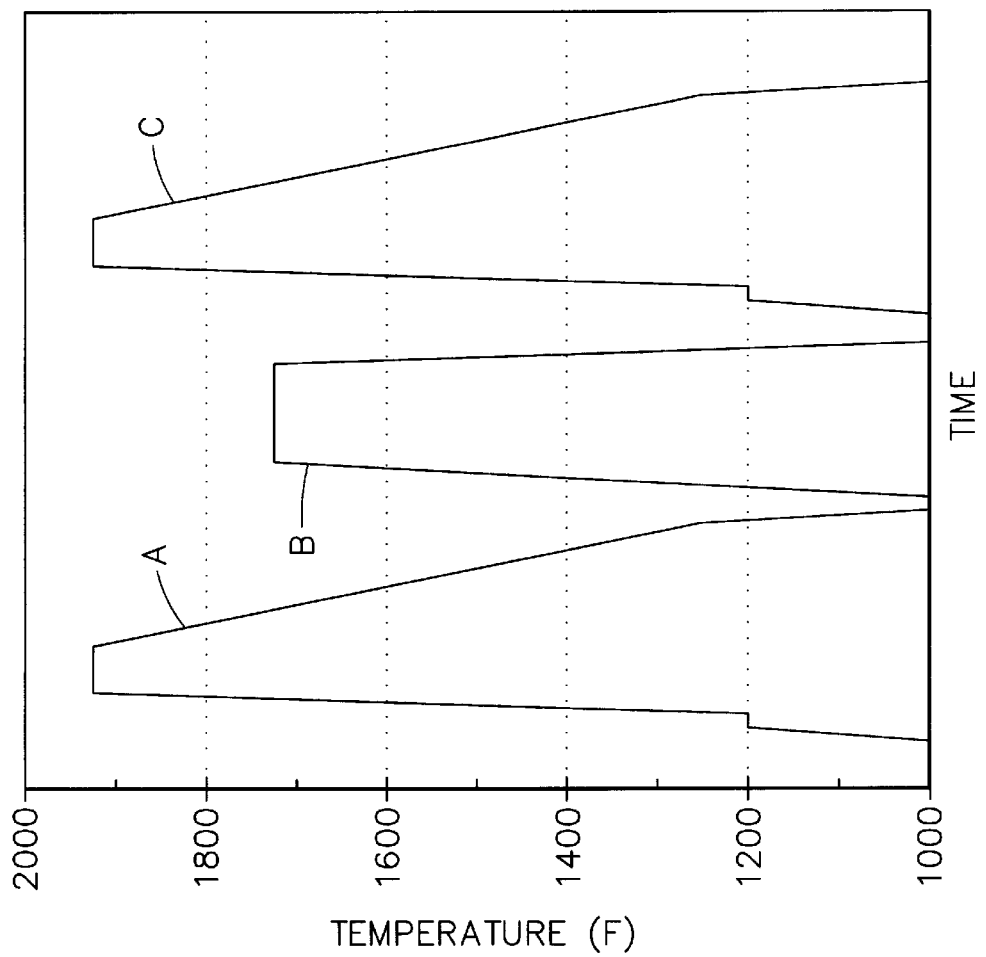

In the past, before undergoing welding within an enclosure of the type shown in FIG. 1, a superalloy article would first be batch heat treated to relax residual stresses present as a result of the service of the article and, if the article is formed of a γ'-strengthened nickel-base superalloy, to provide alloy softening by dissolution of a portion of the hardening γ' phase. A second batch heat treatment would then be performed after welding to relax residual stresses induced during cool down from welding temperatures. These discrete heat treatment cycles are illustrated in FIG. 2 as curves "A" and "C." Curve "B" in FIG. 2 represents a welding cycle during which the article is maintained at an elevated temperature, generally in excess of about 1500° F. (about 815° C.). The heating and cooling ramp rates, soak temperatures, and hold times for stress relief and dissolution heat treatments are critical to obtaining the desired stress relief without adversely affecting the superalloy and its properties. The heat treatment curves A and C include soak temperatures at which the article is maintained for a duration sufficient to relieve stresses in the article, e.g., about twenty to thirty minutes. Because a post-weld heat treatment is to be performed, the temperature and time profile of the welding operations is not so critically, as long as the article is heated to an acceptable temperature prior to welding. As evidenced by the three discrete temperature profiles of FIG. 2, the article being processed is typically cooled to room temperature between cycles, during which time the article is set aside until enough articles are accumulated to perform a batch heat treatment.

Figure 3:
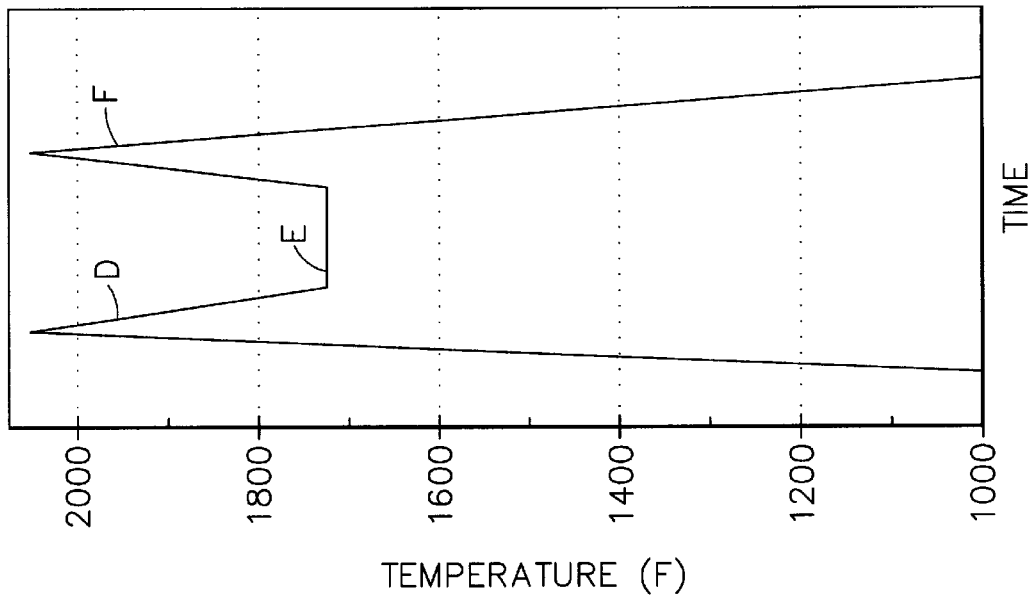
FIGS. 2 and 3 are graphs showing the thermal cycles required for heat treating and welding a superalloy article in accordance with the prior art and this invention, respectively.

In contrast to the process described above, the welding apparatus 10 of this invention enables control of the temperature and time profile within the enclosure 12, and therefore offers the opportunity to perform pre-weld and post-weld stress relief heat treatments and welding within a single furnace using a single variable-temperature thermal exposure, instead of separate batch and welding furnaces required in the past. Importantly, the preferred process carried out in the welding apparatus 10 does not involve cooling the article between temperature cycles as shown in FIG. 2, but instead cools the article directly from a pre-weld temperature profile "D" to a welding profile "E," and then heats the article directly from the welding profile F to a post-weld temperature profile "F," as shown in FIG. 3. A comparison of FIGS. 2 and 3 shows that the pre-weld and post-weld profiles D and F in FIG. 3 do not include constant-temperature soaks characteristic of the corresponding profiles A and C, respectively, of FIG. 2. Furthermore, the peak temperatures for the pre-weld and post-weld profiles D and F in FIG. 3 exceed the corresponding soak temperatures for the profiles A and C respectively, of FIG. 2. The result is not only a reduced cycle time by eliminating cool downs to room temperature, but also shorter heat treatment cycles (D and F) before and after welding. However, the profiles D and F of FIG. 3 and this invention could include soaks as shown in FIG. 2; for example, substituting the approximately 1900° F. soaks shown in FIG. 2 for the approximately 2050° F. peaks shown in FIG. 3.

The above operational capabilities are achieved by detecting the temperature of the article within the enclosure 12 with a suitable temperature sensor 24, such as an optical pyrometer or a standard-type K thermocouple. The temperature signal from the sensor 24 is used as input to a programmable temperature controller 26, which compares the signal from the sensor 24 to the desired profiles D, E and F stored in memory 28 for the article. The control signal to the heating device 14 is then regulated based on the difference between the desired temperature profile and the temperature of the article. In this manner, essentially any temperature profile required for a given superalloy article can be programmed and accurately controlled to achieve the objects of this invention.

In view of the above, it can be seen that the present invention provides for the integration of heat treatment and welding cycles within a single apparatus, with the result that what was previously three discrete temperature profiles are consolidated into a single thermal exposure. Advantages include the elimination of batch heat treatments, the elimination of cool downs to room temperature between treatments, and the shortening of the individual treatment profiles. While discussed in terms of certain equipment for the processing of superalloy articles, the apparatus 10 of this invention could also be employed for the treatment and welding of other materials and articles whose processing requires accurate control at elevated temperatures to avoid degradation of the article properties. Therefore, while the invention has been described in terms of a preferred embodiment, it is apparent that other forms could be adopted by one skilled in the art. Accordingly, the scope of the invention is to be limited only by the following claims.

What is claimed is:

1. A method of welding a superalloy article, the method comprising the steps of:

establishing a pre-weld heat treatment temperature profile, a welding temperature profile, and a post-weld heat treatment temperature profile for a superalloy article, wherein the welding temperature profile consists of temperatures below the pre-weld and post-weld heat treatment temperature profiles;

placing the superalloy article in an enclosure having means for heating the article, means for sensing a temperature of the article, and means for controlling the heating means based on the temperature of the article and according to the pre-weld heat treatment temperature profile, the welding temperature profile, and the post-weld heat treatment temperature profile;

operating the heating means, the sensing means and the controlling means to heat the superalloy article according to the pre-weld heat treatment temperature profile;

without removing the article from the enclosure, operating the heating means, the sensing means and the controlling means to heat the superalloy article directly from the pre-weld heat treatment temperature profile to the welding temperature profile;

welding the article while maintaining the temperature of the article according to the welding temperature profile; and then without removing the article from the enclosure, operating the heating means, the sensing means and the controlling means to heat the superalloy article directly from the welding temperature profile to the post-weld heat treatment temperature profile;

wherein at least one of the pre-weld and post-weld heat treatment temperature profiles is characterized by the absence of a constant temperature soak.

2. A method as recited in claim 1, wherein both of the pre-weld and post-weld heat treatment temperature profiles are characterized by the absence of a constant temperature soak.

3. A method as recited in claim 1, wherein the temperature of the article is sensed with an optical pyrometer.

4. A method as recited in claim 1, wherein the heating means is selected from the group consisting of quartz halogen lamps, induction coils, and silicon carbide elements.

5. A method as recited in claim 1, wherein the welding step is performed with a welding apparatus selected form the group consisting of tungsten inert gas, plasma transferred arc, and laser beam welders.

* * * * *